United States Patent [19]
Schoene et al.

[11] Patent Number: 5,730,434
[45] Date of Patent: Mar. 24, 1998

[54] CLAMPING DEVICES FOR COMPOUND MITER SAWS

[75] Inventors: Keith R. Schoene, St. Charles; Curtis J. Eccardt, St. Peters, both of Mo.

[73] Assignee: Emerson Electric Co., St. Louis, Mo.

[21] Appl. No.: 592,263

[22] Filed: Jan. 26, 1996

[51] Int. Cl.$^6$ ................ B23D 47/04; B25B 1/10
[52] U.S. Cl. ................ 269/88; 269/76; 269/249; 83/464; 83/466; 83/859
[58] Field of Search .................. 269/88, 76, 249; 83/464, 466, 452, 468.2, 468.7, 471.3, 467.1, 859; 144/287

[56] References Cited

U.S. PATENT DOCUMENTS

| | | | |
|---|---|---|---|
| 914,299 | 3/1909 | McCarthy | 83/466 |
| 3,170,708 | 2/1965 | Miller | 269/249 X |
| 4,283,977 | 8/1981 | Batson | 83/464 X |
| 4,619,446 | 10/1986 | Yang | 269/88 |
| 4,681,305 | 7/1987 | Green | 269/88 X |
| 4,753,425 | 6/1988 | Yang | 269/88 X |
| 4,867,427 | 9/1989 | Cunningham | 269/88 |
| 5,103,704 | 4/1992 | Spath et al. | 83/466 X |
| 5,146,826 | 9/1992 | Shiotani et la. | 83/468.2 |
| 5,239,905 | 8/1993 | Dunn | 83/466 X |
| 5,564,323 | 10/1996 | Sasaki et al. | 83/471.3 |

FOREIGN PATENT DOCUMENTS

| | | | |
|---|---|---|---|
| 3347232 A1 | 7/1985 | Germany | 269/88 |
| 194848 | 11/1982 | Japan | 269/76 |
| 2271527 | 4/1994 | United Kingdom | 144/287 |

OTHER PUBLICATIONS

Sears Craftsman Miter Saw Accessory Kit Catalog No. 9–23469, 2 pages, Published Oct. 1988.
DeWalt Miter Saw Accessories Sheet, 1 p., Data Unknown.

*Primary Examiner*—Eugenia Jones
*Assistant Examiner*—Charles Goodman
*Attorney, Agent, or Firm*—Polster, Lieder, Woodruff & Lucchesi

[57] ABSTRACT

A miter saw clamp accessory to facilitate vertical and/or horizontal clamping of a workpiece against a supporting worktable and fence is disclosed. The miter saw clamp accessory includes a pair of extension rods extending laterally outwardly from one end of a frame with a clamp support mounted on such extension rods. A clamp shaft is adapted to be mounted in a top opening of the clamp support for vertical clamping or in a side opening of the clamp support for horizontal clamping of the workpiece. A clamp assembly is mounted on the clamp shaft and includes a connecting arm for adjustable mounting of a clamping arm having a workpiece clamp at one end that is arranged for confronting opposed positioning relative to the frame for vertical clamping or to the fence for horizontal clamping of the workpiece. A miter saw crown molding jig accessory is also disclosed for mounting on a miter saw frame. This accessory includes a shaft mounted immediately adjacent to the worktable fence and a clamp head that is adjustably mounted on the shaft and includes a vertically extending bearing surface and a horizontally extending upper shoulder which overhangs the vertically extending bearing surface. The clamp head is moved on the shaft until the horizontally extending upper shoulder rests on a top edge of the crown molding while the vertically extending bearing surface engages a side edge of the crown molding in alignment with the worktable fence.

8 Claims, 6 Drawing Sheets

CLAMPING DEVICES FOR COMPOUND MITER SAWS

BACKGROUND OF THE INVENTION

The present invention relates to clamping devices for compound miter saws, and more particularly, to a miter saw clamp accessory to facilitate vertical and horizontal clamping of a workpiece against a supporting table and fence, as well as a miter saw crown molding jig accessory for clamping crown molding against a workpiece fence.

Compound miter saws permitting miter and bevel cutting of wood, metals, and plastics have replaced hand miter boxes and powered miter saws that have not permitted both miter and bevel cuts. As a result, compound miter saws are now widely used for the miter and bevel cutting of a variety of different wood, metal, and plastic products.

In order to assist in such miter and bevel cutting of workpieces, it is necessary to hold a workpiece against either a supporting worktable and/or fence of the compound miter saw. As will be appreciated, a miter saw clamp accessory to restrain vertical and horizontal movement of a workpiece when performing certain cutting operations will sometimes be preferred over manual holding down of such workpieces by a user. Thus, a miter saw clamp accessory to facilitate vertical or horizontal clamping of a workpiece against a supporting worktable and fence is desirable.

In addition, it is challenging to properly position crown molding for cutting by a compound miter saw. As will be appreciated, crown molding has an outer configuration with a different cross sectional height at various points throughout and this makes it difficult to position for cutting purposes. The present invention discloses a miter saw crown molding jig accessory that facilitates the positioning of crown molding in a compound miter saw.

SUMMARY OF THE INVENTION

Among the several objects and advantages of the present invention include:

The provision of new and improved clamping devices which hold a workpiece against a supporting worktable and/or fence in order to facilitate cutting thereof;

The provision of the aforementioned clamping devices including a miter saw clamp accessory to facilitate vertical and/or horizontal clamping of a workpiece against the supporting worktable and fence;

The provision of a locating or positioning device which includes a miter saw crown molding jig accessory which facilitates accurate, repetitive positioning of crown molding, while also enabling the locating device to remain adjusted in place as other workpieces are sawed;

The provision of the aforementioned clamping and locating devices which are readily adaptable to compound miter saws including ease of mounting, ease of use, ease of adjustment, and ease of cutting; and The provision of the aforementioned clamping devices which are simple to manufacture and use; durable and long-lasting in operation; capable of facilitating workpiece cutting operations, and otherwise well adapted for the purposes intended.

Briefly stated, the clamping devices for use in connection with a compound miter saw include a miter saw clamp accessory and a miter saw crown molding jig accessory, as further described below.

The miter saw clamp accessory facilitates vertical and horizontal clamping of a workpiece against a supporting worktable and fence. This accessory includes at least one pair of extension rods that extends laterally outwardly from one end of a supporting frame. A clamp support is mounted on the extension rods and includes top and side openings extending generally transverse to one another. A clamp shaft can be mounted in either the top opening of the clamp support for vertical clamping of a workpiece or in the side opening of the clamp support for horizontal clamping of a workpiece. A clamp assembly is mounted on the clamp shaft and includes a connecting arm for adjustably mounting a clamping arm having a workpiece clamp at one end that is arranged for confronting opposed positioning relative to the frame for vertical clamping and to the fence for horizontal clamping.

The clamping arm is threaded for adjustable threaded engagement relative to the connecting arm and includes a manually engageable knob at one end opposite to the workpiece clamp for manual adjustment of the threaded clamping arm and workpiece clamp relative to the frame or fence. The clamp support is adjustably mounted on the extension rods. Also, a connecting arm is adjustably mounted on the clamp shaft.

A rod bracket is mounted on the extension rods adjacent an inside face of the frame for securing the extension rods to the frame.

The clamp support is generally co-planar with an upper surface of the frame to facilitate vertical clamping of the workpiece while the clamp at one end of the clamping arm extends generally parallel to the fence to facilitate horizontal clamping of a workpiece.

With respect to the miter saw crown molding jig accessory for mounting on a workpiece fence, this accessory includes a shaft that is mounted on the fence. A positioning head is adjustably mounted on the shaft and includes a vertically extending bearing surface and a horizontally extending upper shoulder which overhangs the vertically extending bearing surface. The positioning head is moved on the shaft until the horizontally extending upper shoulder rests on a top edge of the crown molding while the vertically extending bearing surface engages a side edge of the crown molding in alignment with the workpiece fence.

The shaft may be mounted in an opening of the workpiece fence or in an opening of a clamp accessory that is mounted to the miter saw frame.

The positioning head is both rotatably and longitudinally adjustable relative to the shaft. The positioning head has a generally oblong shape with the flat edge along one side of the oblong shape with a vertically extending bearing surface and the horizontally extending upper surface extending throughout the oblong shape of the clamp head.

These and other objects and advantages of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENTS

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Figure 1:
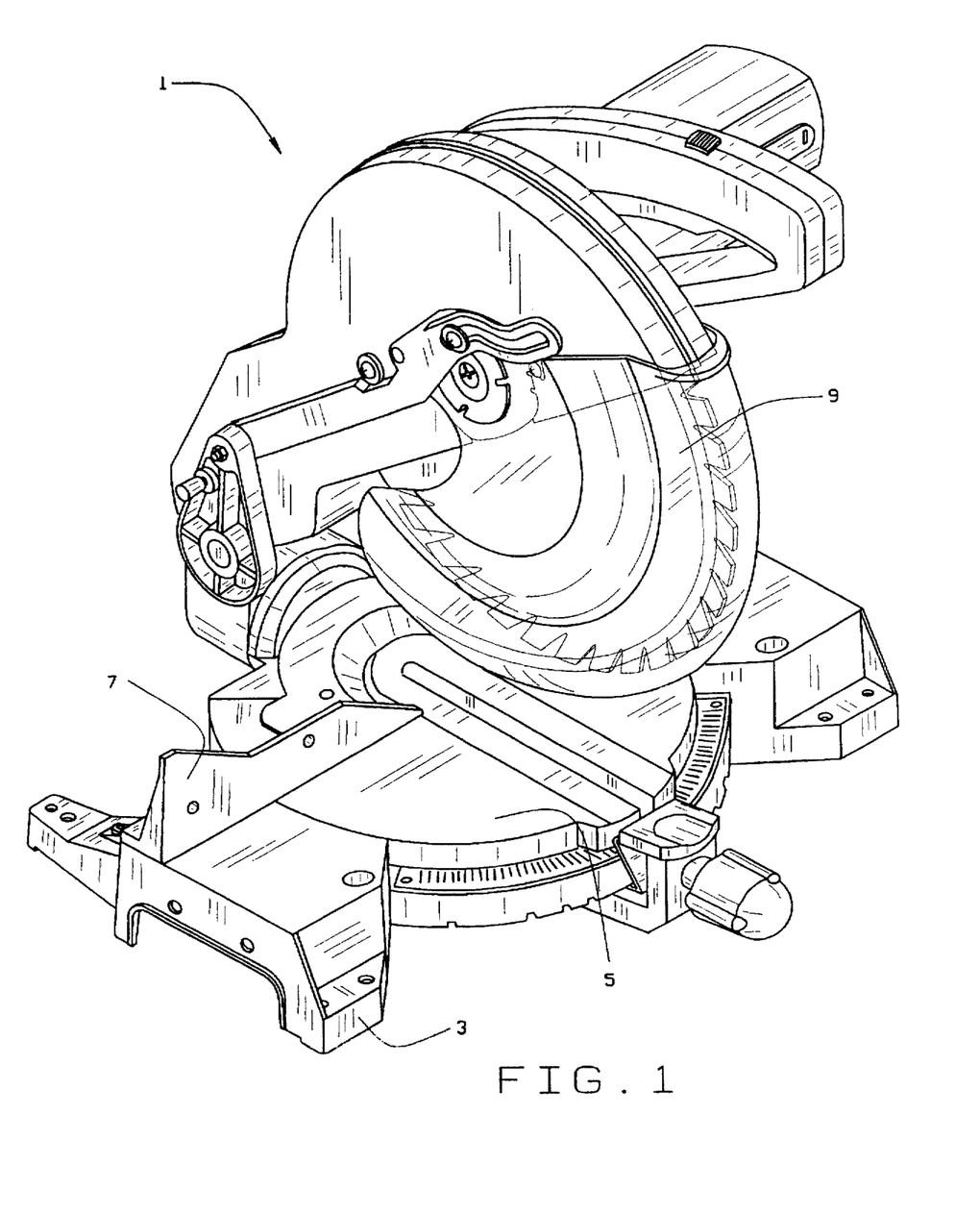
FIG. 1 is a perspective view of one preferred type of compound miter saw adapted for use with the clamping devices of the present invention.

The clamping and/or positioning device accessories of the present invention are designed to be used with a compound miter saw of the type illustrated in FIG. 1 of the drawings. The compound miter saw 1 includes a supporting frame 3 which supports a rotating worktable 5 as well as a workpiece fence 7, as illustrated. Further, the supporting frame 3 both pivotally and rotatably supports a powered saw 9 which is moved from an upper to a lower position to cut workpieces mounted on the rotating worktable 5 that are held up against the workpiece fence 7. Since the power driven saw 9 is both pivotally and rotatably mounted on the supporting frame 3 and the supporting table 5 is rotatably mounted on the frame 3, accurate bevel and miter cutting of workpieces can be obtained, as is well known in the art.

The present invention provides clamping and/or positioning device accessories that both facilitate vertical and horizontal clamping of a workpiece, including specifically crown molding. More specifically, the clamping and/or positioning devices of the present invention include a miter saw clamp accessory and a miter saw crown molding jig accessory which may be used either separately or together, as may be desired.

Figure 5:
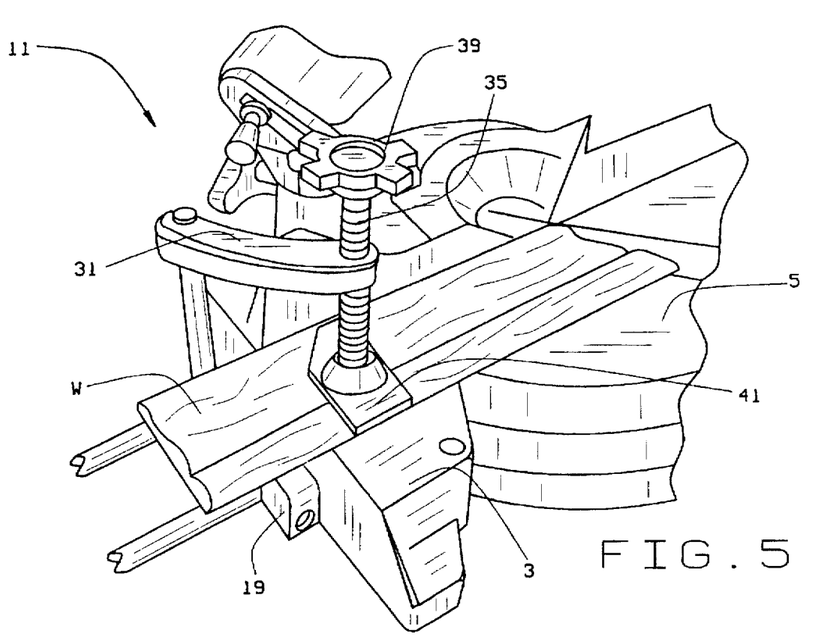
FIG. 5 is a fragmentary top perspective view of the miter saw clamp accessory in use in vertical clamping a workpiece relative to a frame and supporting worktable.
Figure 6:
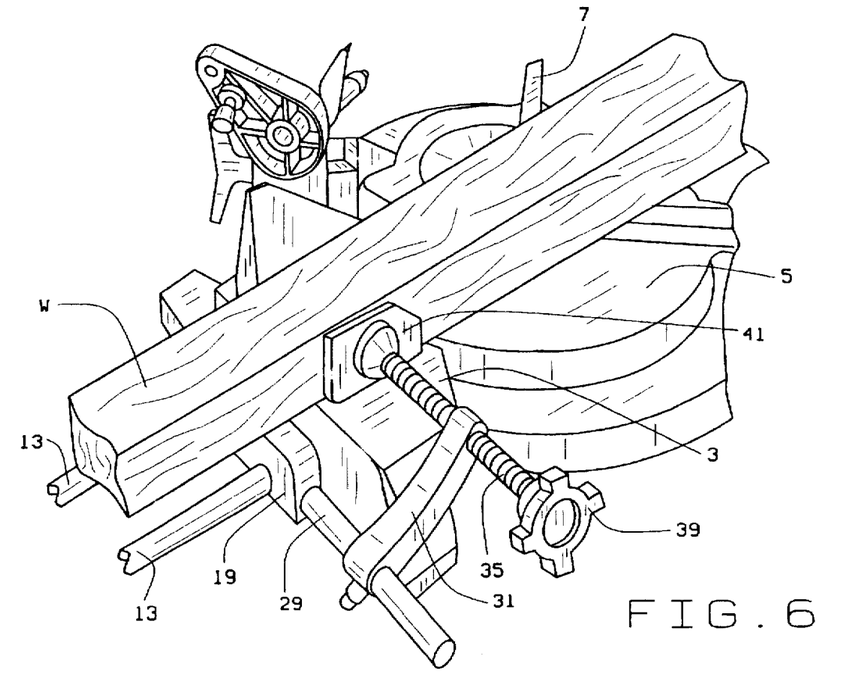
FIG. 6 is a top perspective view of the miter saw clamp accessory in horizontally clamping a workpiece against a compound miter saw fence.

The miter saw clamp accessory is best shown in FIGS. 2–6 of the drawings. Specifically, the miter saw clamp accessory 11 facilitates vertical and horizontal clamping of a workpiece against the supporting worktable 5 and fence 7. For vertical clamping, the miter saw clamp accessory 11 clamps a workpiece W against the supporting frame 3 as shown in FIG. 5, while horizontal clamping of a workpiece W against the workpiece fence 7 is shown in FIG. 6 of the drawings.

The miter saw accessory 11 includes a pair of extension rods 13, 13 which are received within spaced holes 15, 15 at one end of the supporting frame 3. If desired, the pair of spaced holes 15, 15 may be provided in both ends of the supporting frame 3 for alternatively mounting of the miter saw clamp accessory on either the left or right hand side of the miter saw 1. A clamp bracket 17 is mounted over the spaced extension rods 13, 13 on an inside face of the supporting frame 3 in order to secure the spaced extension rods 13, 13 to the supporting frame 3. The pair of extension rods 13, 13 can be separate from each other or attached at one end in a U-shaped construction.

Figure 2:
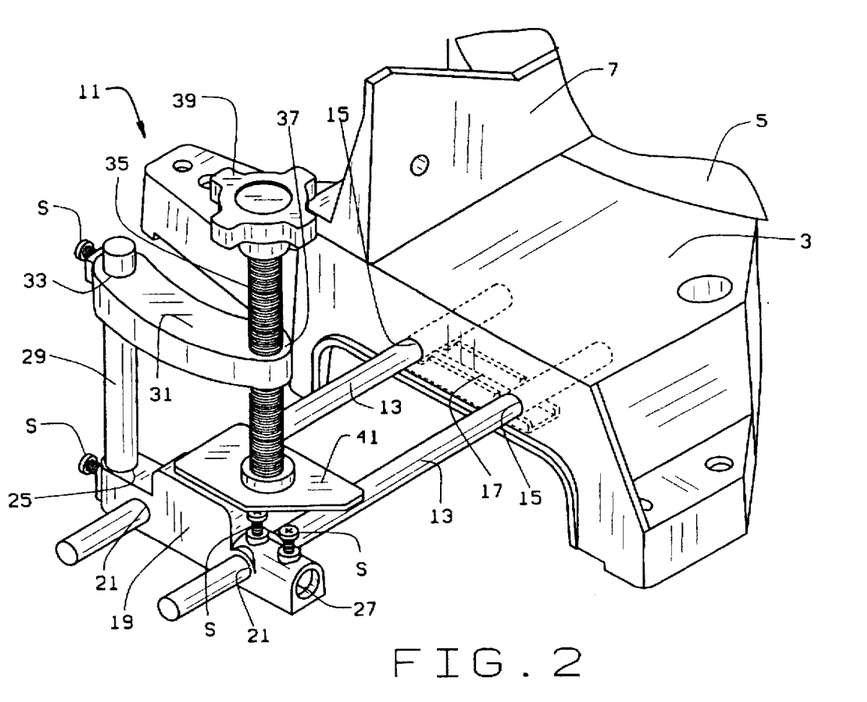
FIG. 2 is a fragmentary perspective view of the miter saw clamp accessory which is constructed in accordance with the teachings of the present invention.
Figure 3:
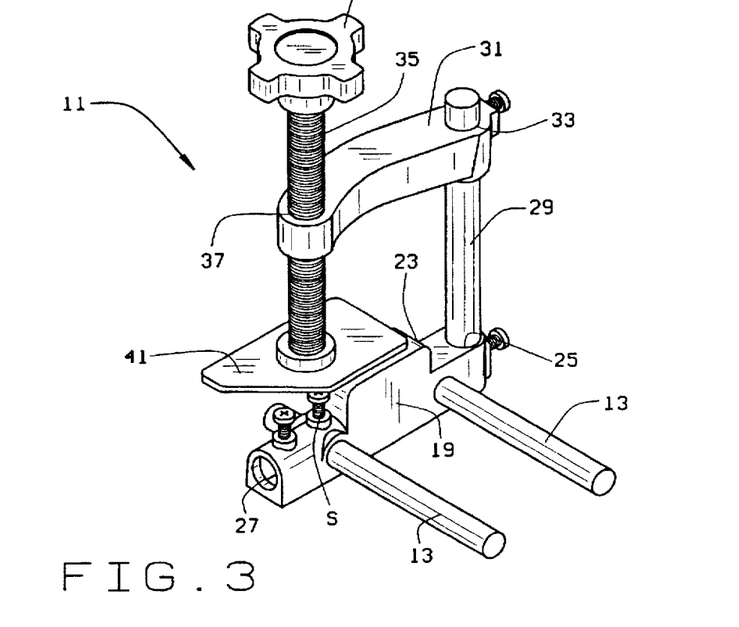
FIG. 3 is a further perspective view of the miter saw clamp accessory from an opposite vantage point than the view illustrated in FIG. 2.
Figure 4:
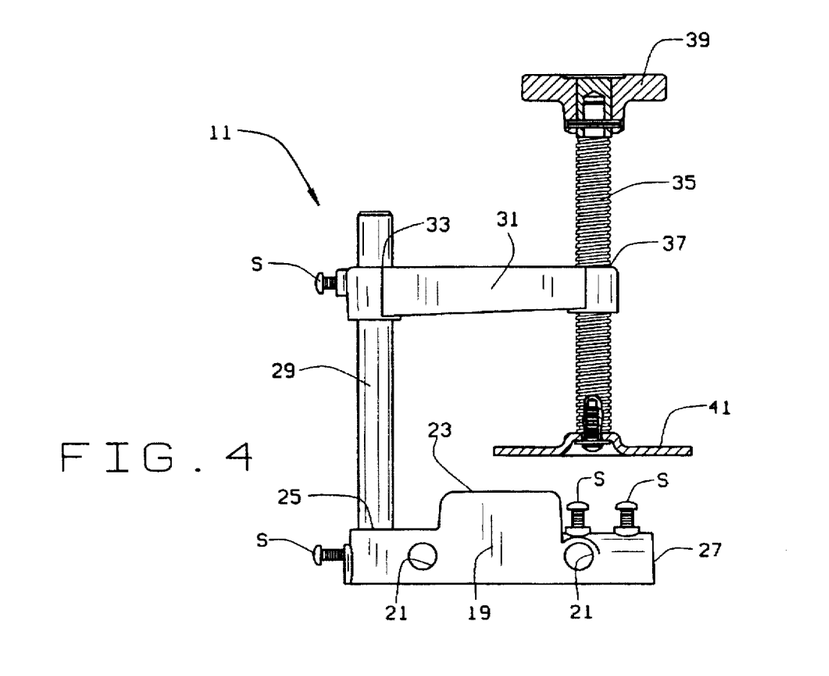
FIG. 4 is a side elevational view, partly in section, of the miter saw clamp accessory shown in FIGS. 2–3.

A clamp support 19 includes spaced aperture 21, 21 for receiving the outer free ends of the spaced extension rods 13, 13, as best illustrated in FIG. 2. Screws S extend through the clamp support 19 for adjustably securing the clamp support 19 at various relative positions along the extension rods 13, 13, as desired. The clamp support includes an upper clamping surface 23 against which a workpiece W is clamped, as will be further explained. The clamp support 19 further includes a top opening 25 and a side opening 27, at opposite ends of the clamp support 19, for receiving a clamp shaft 29 in a vertical position as illustrated in FIGS. 2–5 of the drawings or in a horizontal position as illustrated in FIG. 6 of the drawings. The clamp shaft 29 may be secured in the top opening 25 or side opening 27 by suitable screws S mounted in the clamp support 19 adjacent such top and side openings 25, 27.

For vertical clamping of a workpiece W relative to the supporting frame 3 and the upper surface 23 of the clamp support 19, the miter saw clamp accessory 11 is arranged as shown in FIGS. 2–5 of the drawings in which the clamp shaft 29 is mounted within the top opening 25 of the clamp support 19. A clamp assembly is mounted on the clamp shaft 29 and includes a connecting arm 31 having an opening 33 at one end for receiving an upper end of the clamp shaft 29. A screw S is mounted in the connecting arm 31 at one end for securing the connecting arm 31 at various adjustable positions relative to the clamp shaft 29, as will be apparent. The clamp assembly, in addition to the connecting arm 31, includes a threaded clamping rod or arm 35 that extends through a threaded aperture 37 in the connecting arm 31 at an end opposite the opening 33. The threaded clamping rod or arm 35 includes a manually engageable knob 39 at an upper end for manual threaded adjustment of the threaded clamping rod or arm 35 relative to the connecting arm 31. At the lower end of the threaded clamping rod or arm 35 is a workpiece clamp 41 which is illustrated in FIGS. 2–5 of the drawings as being positioned in confronting opposed relationship relative to the upper clamping surface 23 of the clamp support 19, while being free to rotate relative to the threaded clamping rod or arm 35.

As best illustrated in FIG. 5 of the drawings, vertical clamping of a workpiece W against the supporting frame 3 is achieved through the miter saw clamp accessory 11. As illustrated, the clamp 41, at the lower end of the threaded clamping rod or arm 35, engages an upper surface of the workpiece W and is clamped, by manual threaded adjustment of the manually engageable knob 39 and threading the threaded clamping rod or arm 35 against the connecting arm 31 to apply pressure against an upper surface of the workpiece W. In order to facilitate clamping, the upper surface 23 of the clamp support 19 is preferably generally co-planar with an upper surface of the supporting frame 3, in order to provide even clamping of the workpiece W, as will be appreciated.

For horizontal clamping of the workpiece W, the clamp arm 29 is removed from the top opening 25 of the clamp support 19 by unthreading the screw S at one end of the clamp support 19 and by mounting the clamp shaft 29 in the side opening 27 and threading the associated screw S into engagement with the clamp shaft 29. This arrangement is illustrated in FIG. 6 of the drawings where the workpiece clamp 41 is illustrated as being positioned in its generally confronting opposed relationship relative to the fence 7. It will be noted that the workpiece clamp 41 rests on the supporting frame 3 with the workpiece clamp 41 extending generally parallel to the vertically extending confronting surface of the fence 7, in order to facilitate horizontal clamping of the workpiece W.

Figure 7:
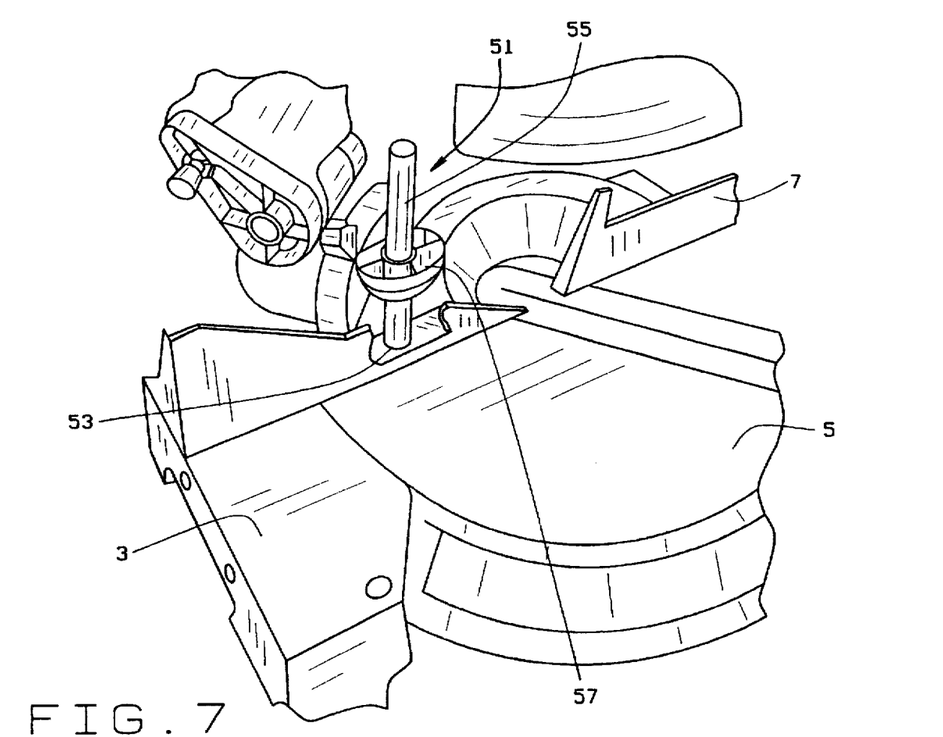
FIG. 7 is a top perspective view of a miter saw crown molding jig accessory mounted on a workpiece fence of a compound miter saw.
Figure 8:
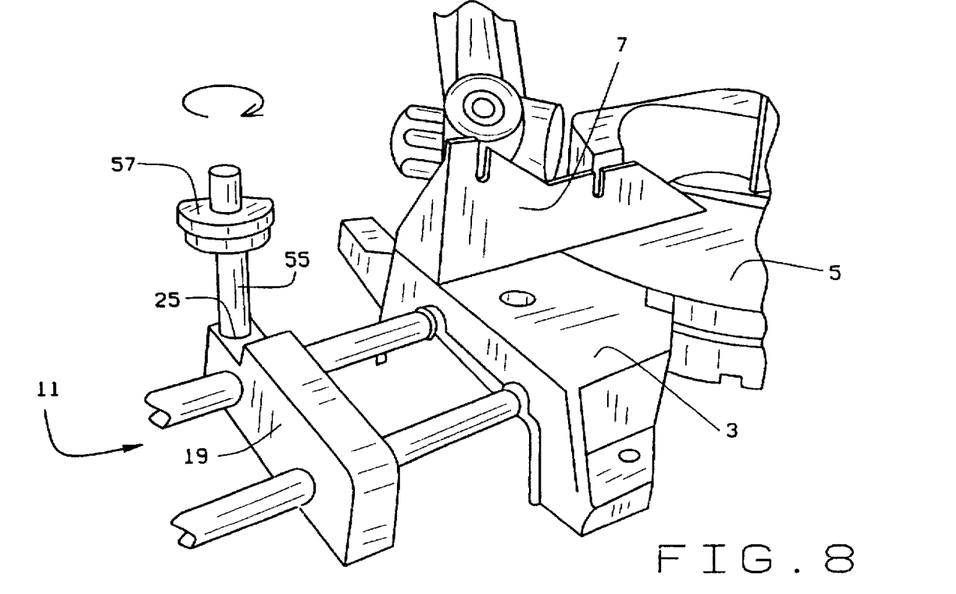
FIG. 8 is a top perspective view of a miter saw crown molding jig accessory mounted on a clamp accessory that is connected to the supporting frame of the compound miter saw.

The present invention also contemplates clamping of crown molding in a miter saw 1, as well. For this purpose, a miter saw crown molding jig accessory 51 shown in FIGS. 7–13 is employed. The miter saw crown molding jig accessory 51 may be mounted on the supporting frame 3 directly on workpiece fence 7, as shown in FIG. 7 of the drawings, or may be mounted in the clamp support 19 of the miter saw clamp accessory 11, as shown in FIG. 8 of the drawings. For mounting on the workpiece fence 7, an opening 53 is provided in the workpiece fence 7, as shown in FIG. 7, and for mounting in the clamp support 19, the miter saw molding jig accessory 51 can be positioned in the top opening 25, as shown in FIG. 8 of the drawings.

Figure 9:
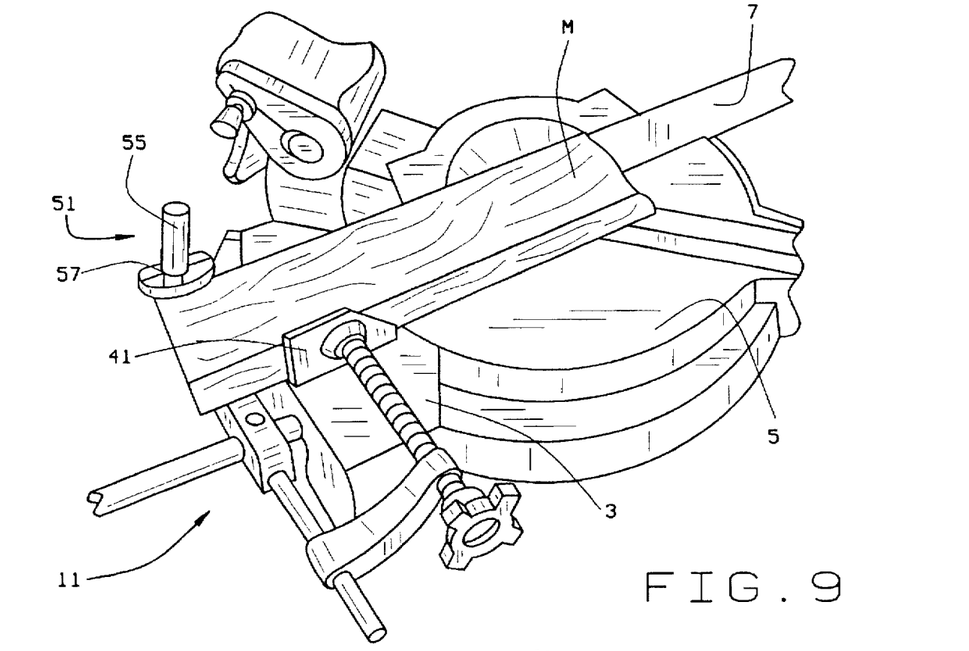
FIG. 9 is a fragmentary top perspective view illustrating the manner in which the crown molding accessory can be used in conjunction with the miter saw clamp accessory in mounting a workpiece relative to a fence of a compound miter saw.
Figure 10:
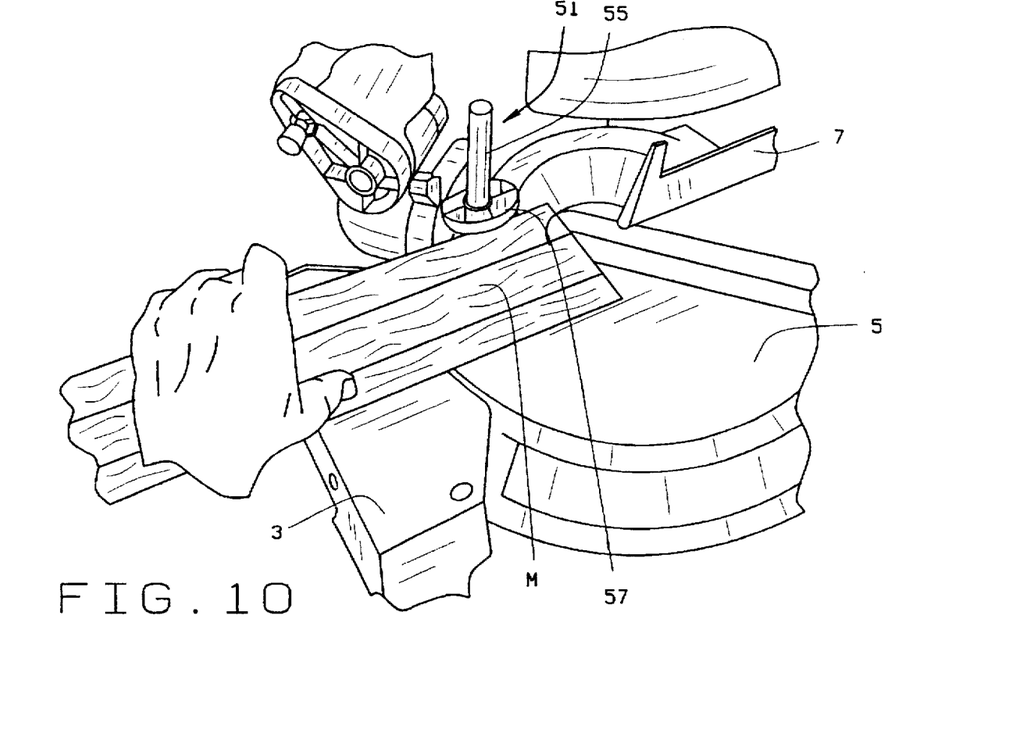
FIG. 10 is a fragmentary top perspective view illustrating the manner in which the miter saw crown molding jig accessory works in conjunction with a fence to provide two point contact with a workpiece.
Figure 11:
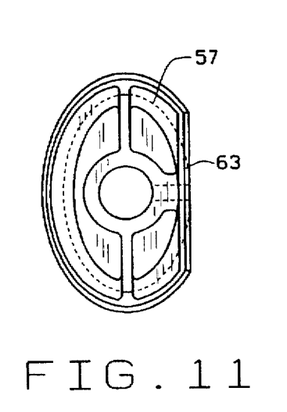
FIG. 11 is a top plan view of the clamp head used in the miter saw crown molding jig accessory.
Figure 12:
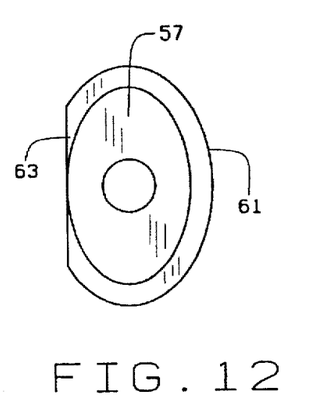
FIG. 12 is a bottom plan view of the clamp head used in the miter saw crown molding jig accessory.
Figure 13:
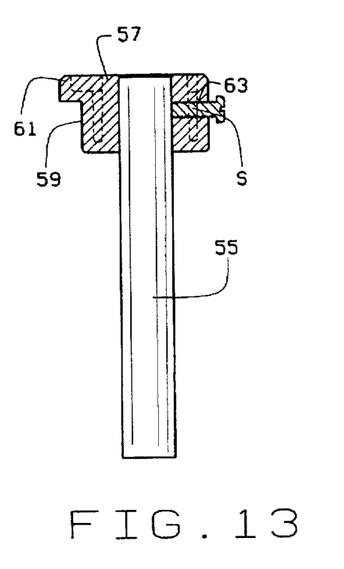
FIG. 13 is a side elevational view, partially in section, of the miter saw crown molding jig accessory of the present invention.

The miter saw crown molding jig accessory 51 includes a shaft 55 sized to suitably be received within the opening 53 in the workpiece fence 7 or the top opening 25 of the clamp support 19, as illustrated in FIGS. 7 and 8, respectively. The miter saw crown molding jig accessory 51 further includes a positioning head 57 that is adjustably mounted on the shaft 55 and includes, as best illustrated in FIGS. 11–13 of the drawings, a vertically extending bearing surface 59 and a horizontally extending upper shoulder 61. The positioning head 57 is arranged to be moved on the shaft 55 until the horizontally extending upper shoulder 61 rests on a top edge of crown molding M, as shown in FIGS. 9–10, while the vertically extending bearing surface 59 engages a side edge of the crown molding M in alignment with the workpiece fence 7. For this purpose, the screw S shown in FIG. 13 is tightened or loosened to mount the positioning head 57 in various relative positions on the shaft 55.

It will be noted that the positioning head 57 has a generally oblong shape with a flat edge 63 along one side of the oblong shape. It is in this area that the screw S is mounted for adjustably and threadably engaging the shaft 55 at various levels in order to mount the clamp head in various relative positions on the shaft 55. Thus, the positioning head 57 is both rotatably and longitudinally adjustable on the shaft 55 for engaging the molding M, as illustrated in FIGS. 9–10 of the drawings.

In FIG. 9 of the drawings, the miter saw clamp accessory 11 is shown as being mounted in its horizontal position for engaging the molding M between the workpiece clamp 41 and the fence 7. As illustrated, the miter saw crown molding jig accessory 51 is used in conjunction with the miter saw clamp accessory 11. In this regard, the miter saw crown molding jig accessory 51 has its positioned head 57 positioned such that the horizontally extending upper shoulder 61 rests on a top edge of the crown molding M while the vertically extending bearing surface 59 of the positioning head 57 engages a side edge of the crown molding M in alignment with the workpiece fence 7, on an opposite side of the crown molding M from the miter saw clamp accessory 11.

In FIG. 10 of the drawings, the positioning head 57 of the miter saw crown molding jig accessory engages the crown molding M in a two point contact with the workpiece fence 7, as illustrated. In this instance as well, the positioning head 57 has its horizontally extending upper shoulder 61 resting on the top edge of the crown molding M while the vertically extending bearing surface 59 of the positioning head 57 engages a side edge of the crown molding in alignment with the workpiece fence 7. The miter saw crown molding jig accessory 51 engages the crown molding M at one point while the workpiece fence 7 engages the crown molding M at a second point in order to assure proper alignment of the crown molding M relative to the workpiece fence 7. As illustrated in FIG. 10, the workpiece can be held in the two point contact arrangement by a user's hand or by clamping through the use of the miter saw clamp accessory 11, in order to assure that the crown molding M is held or clamped in this two point contact set-up for accurate and efficient cutting, as desired.

From the foregoing, it will be appreciated that the miter saw clamp accessory and miter saw crown molding jig accessory may be used either independently, or in some cases, preferably together to achieve the desired clamping of workpieces.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

We claim:

1. A miter saw clamp accessory to facilitate vertical clamping of a workpiece against a supporting frame as well as horizontal clamping of the workpiece against a fence mounted on the supporting frame, comprising:

a pair of extension rods extending laterally outwardly from one end of the frame;

a clamp support mounted on said pair of extension rods, said clamp support including top and side openings extending generally transverse to one another;

a clamp shaft mounted in the top opening of said clamp support to facilitate vertical clamping of the workpiece against the supporting frame, said clamp shaft being movable from the top opening to the side opening of said clamp support to facilitate horizontal clamping of the workpiece against a fence mounted on the supporting frame; and a clamp assembly mounted on said clamp shaft, said clamp assembly including a clamping arm, a connecting arm for adjustable mounting of the clamping arm, and an associated workpiece clamp at one end of the clamping arm, the workpiece clamp vertically clamping the workpiece against the supporting frame when the clamp shaft is mounted in the top opening of the clamp support and horizontally clamping the workpiece against the fence when the clamp shaft is mounted in the side opening of the clamp support.

2. The miter saw clamp accessory as defined in claim 1 wherein said clamping arm is threaded for adjustable threaded engagement relative to said connecting arm and includes a manually engageable knob at an end opposite to said workpiece clamp for manual adjustment of said threaded clamping arm and workpiece clamp relative to said frame or fence.

3. The miter saw clamp accessory as defined in claim 1 wherein said clamp support is adjustably mounted on said pair of extension rods.

4. The miter saw clamp accessory as defined in claim 1 wherein said connecting arm is adjustably mounted on said clamp shaft.

5. The miter saw clamp accessory as defined in claim 1 including a rod bracket mounted on said extension rods adjacent an inside face of said frame for securing said extension rods to said frame.

6. The miter saw clamp accessory as defined in claim 1 wherein said clamp support is generally co-planar with an upper surface of the supporting frame to facilitate vertical clamping of the workpiece against the supporting frame.

7. The miter saw clamp accessory as defined in claim 1 wherein the workpiece clamp at one end of said clamping arm extends generally parallel to said fence to facilitate horizontal clamping of the workpiece.

8. A miter saw clamp accessory to facilitate vertical clamping of a workpiece against a supporting frame as well as horizontal clamping of the workpiece against a fence mounted on the supporting frame, comprising:

a pair of extension rods extending laterally outwardly from one end of the frame;

a clamp support mounted on said pair of extension rods, said clamp support being co-planar with an upper surface of said frame and including top and side openings extending generally transverse to one another;

a clamp shaft mounted in the top opening of said clamp support to facilitate vertical clamping of the workpiece and being movable to the side opening of said clamp support for horizontal clamping of the workpiece;

a clamp assembly mounted on said clamp shaft, said clamp assembly including a clamping arm, a connecting arm for adjustable mounting of the clamping arm, and an associated workpiece clamp at one end of the clamping arm, the workpiece clamp being vertically adjustable for vertically clamping the workpiece against the supporting frame when the clamp shaft is mounted in the top opening of the clamp support, the workpiece clamp being horizontally adjustable for horizontally clamping the workpiece against the fence when the clamp shaft is mounted in the side opening of the clamp support, and the connecting arm being adjustably slidably mounted on the clampshaft while the workpiece clamp is threadly adjustably mounted on the clamping arm.

* * * * *